United States Patent [19]
Mori

[11] Patent Number: 6,064,458
[45] Date of Patent: May 16, 2000

[54] RUBBING APPARATUS AND RUBBING METHOD

[75] Inventor: Shigeru Mori, Tokyo, Japan

[73] Assignee: NEC Corporation, Tokyo, Japan

[21] Appl. No.: 09/181,641

[22] Filed: Oct. 29, 1998

[30] Foreign Application Priority Data

Nov. 4, 1997 [JP] Japan ................................ 9-301926

[51] Int. Cl.⁷ .............................................. G02F 1/1333
[52] U.S. Cl. ........................... 349/124; 349/126; 349/187
[58] Field of Search .................................... 349/124, 126, 349/187

[56] References Cited

U.S. PATENT DOCUMENTS 5,315,421  5/1994  Kurai et al. ............................. 349/126
5,459,594  10/1995  Nakanishi et al. ..................... 349/187

FOREIGN PATENT DOCUMENTS

3-126917  5/1991  Japan .
5-323302  12/1993  Japan .
6-95119  4/1994  Japan .

Primary Examiner—James A. Dudek
Attorney, Agent, or Firm—Sughrue, Mion, Zinn, Macpeak & Seas, PLLC

[57] ABSTRACT

A rubbing apparatus of the present invention for rubbing the substrate of a liquid crystal display element cell, comprises: a jig for enclosing a corner of the substrate; a measuring device for measuring the vertical position of a surface of the substrate and outputting a measured value; a comparison device for comparing the measured value with a vertical position of a surface of the jig; and a jig drive device for moving the jig in a vertical direction based on a signal from the comparison means so as to set a difference between the vertical position of the surface of the jig and the vertical position of the surface of the substrate within a predetermined value.

34 Claims, 5 Drawing Sheets

RUBBING APPARATUS AND RUBBING METHOD

FIELD OF THE INVENTION

The present invention relates to a rubbing apparatus and a rubbing method, and more particularly to an apparatus and a method for performing an orientating process for a molecular orientating film of a liquid crystal display device.

This application is based on Japanese Patent Application No. Hei 9-301926, the contents of which are incorporated herein by reference.

BACKGROUND ART

Liquid crystal devices include organic or inorganic orientating films which are made of, for example, polyimide or SiO, and which are formed on their surfaces of transparent substrates made of glass or the like. In a rubbing process performed before assembly of the liquid crystal devices, the surfaces of the orientating films are rubbed by a fibroid rubbing member in one direction, and thereby liquid molecules are orientated in a predetermined direction.

Figure 4:
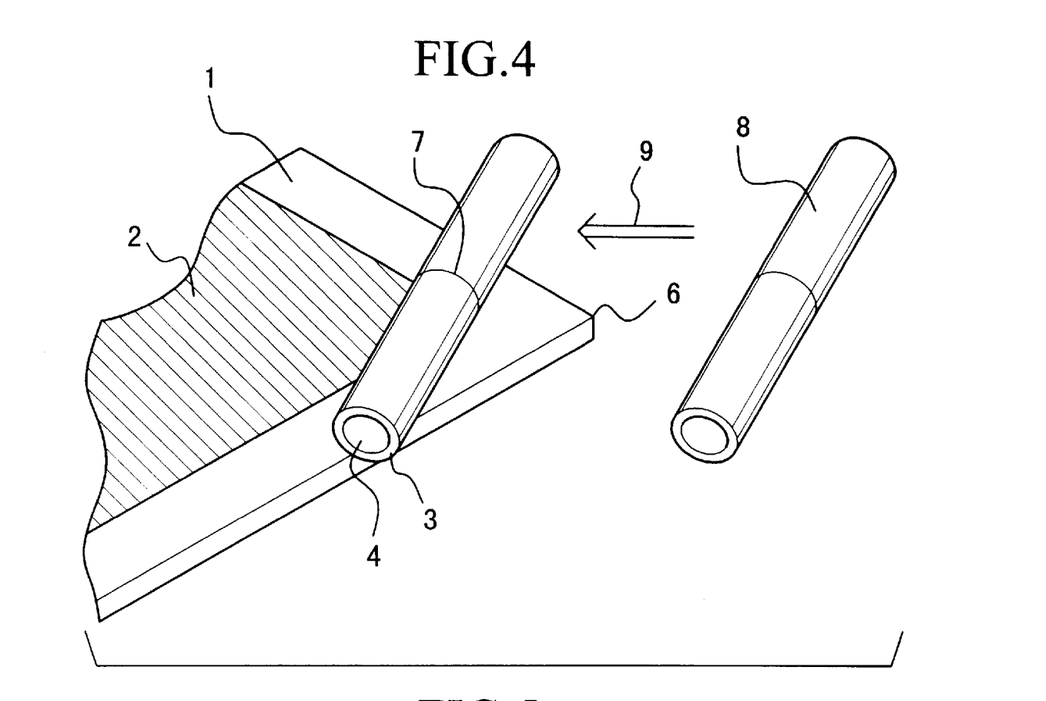
FIG. 4 is a perspective view showing a rubbing apparatus of the background art.
Figure 5:
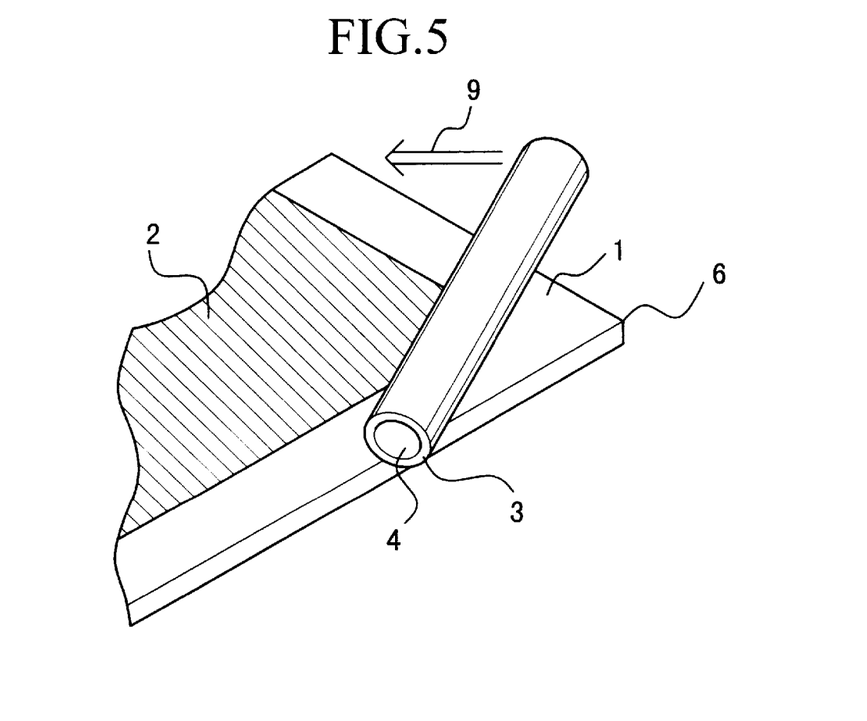
FIG. 5 is a perspective view showing another rubbing apparatus of the background art.

Japanese Patent Application, First Publication, No. Hei 3-126917 discloses a rubbing method as shown in FIGS. 4 and 5. Referring to FIG. 4, to make a positive visible angle consistent with a viewing angle, rubbing is performed obliquely with respect to a side of the substrate 1. In a conventional rubbing method, a rubbing roller 4 is moved down obliquely from upper onto a starting position 8 whose vertical position corresponds to that of the substrate 1 and whose horizontal position is separated from that of the substrate 1, and then starts rotation. The rubbing roller 4 is moved in a rubbing roller moving direction 9, rubbing the orientating film 2 of the substrate 1.

A rubbing cloth 3 starts to come in contact with a corner 6 of the substrate 1, at which point hairs of the rubbing cloth 3 may fall off, be cut off, or lie down, thereby making the hairs in contact with the corner 6 irregular. Orientating irregularities may thereby arise in an area rubbed by the irregular hairs 7, and display of the liquid crystal display may become irregular.

Referring FIG. 5, in order to avoid the irregularities of the orientation due to the irregular hairs caused by the contact between the rubbing cloth and the corner 6 of the substrate 1, the rubbing cloth 3 on the surface of the rubbing roller 4 starts to come in contact with, not the corner 6 of the substrate 1, but an inner portion of the corner 6 at the start.

That is, the rubbing roller 4 is moved down from upper to the inner portion of the corner when it starts rubbing, preventing the hairs of the rubbing cloth 3 from falling off, being cut off, and lying down when the rubbing cloth 3 comes in contact with the substrate 1 at the start.

However, there is a problem that a sufficient space is necessary between the corner 6 of the substrate 1 and a border of the orientating film because the rubbing roller 4 must be moved down therebetween. The space must be longer than a contact length of the rubbing cloth 3 against the substrate 1. When the length of the space is less than the contact length, the rubbing cloth 3 may come in contact with the corner 6 when the rubbing roller 4 is moved down, and the above effect cannot be achieved.

In general, the contact length of the rubbing cloth against the substrate is set in a range of approximately 10 to 20 mm. According to the method shown in FIG. 5, the orientating film cannot be applied to an area within 10 to 20 mm from the corner 6 of the substrate, and this reduces the display area of the liquid crystal display device, thus lowering production efficiency.

Figure 6:
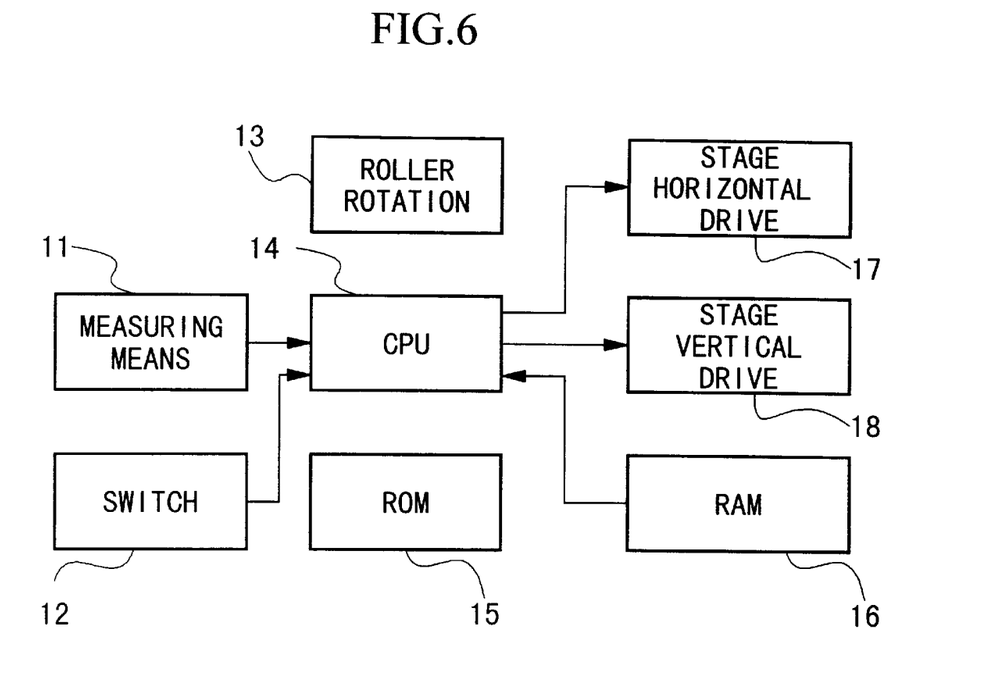
FIG. 6 is a block diagram showing another rubbing apparatus of the background art.

Japanese Patent Application, First Publication, No. Hei 6-95119 discloses a rubbing apparatus shown in FIG. 6. The apparatus has a switch 12 for starting and terminating an operation, and a measuring means 11 for measuring a vertical position of a surface of a substrate and converting the measured value into a quantity of electricity, which is output to a central processing unit 14.

The central processing unit 14 stores the measured value in a random-access memory 16. A read-only memory 15 beforehand stores the value of the gap between the substrate and the rubbing roller which is predetermined so as to obtain an appropriate pressure. A movement distance of a stage which is movable vertically is calculated based on these values. The stage is moved up or down by the movement distance by means of a stage vertical movement drive 18.

The stage is moved horizontally by means of a stage horizontal movement drive 17 so that the substrate approaches the rubbing roller. Then, the rubbing roller starts to rotate due to a roller rotator 13 and rubs the substrate with the appropriate rubbing pressure.

Figure 7:
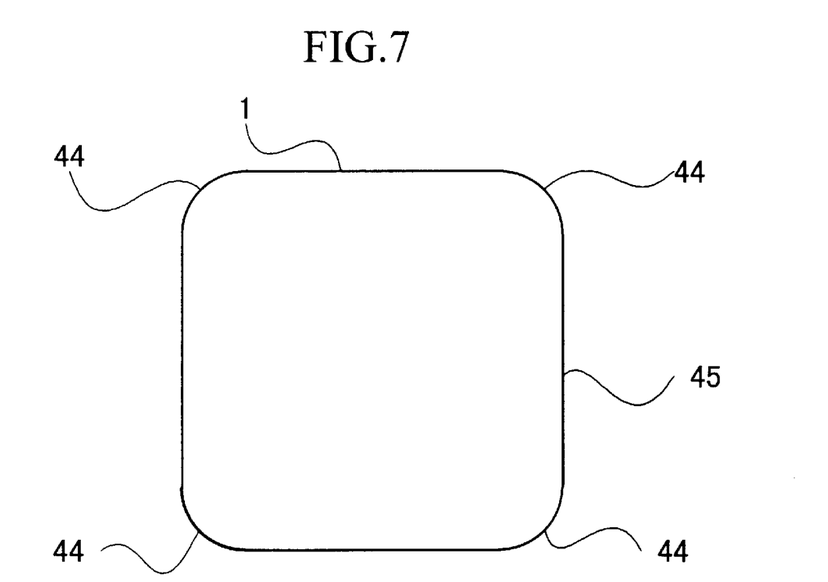
FIG. 7 is a top view showing another rubbing apparatus of the background art.

Referring to FIG. 7, a rubbing method disclosed in Japanese Patent Application, First Publication, No. Hei 5-323302 will be explained. Edges 45 and corners 44 of a substrate 1 of a liquid crystal display device are chamfered so as to have curved surfaces. This prevents hairs of a rubbing cloth from falling off, being cut off, and lying down when the rubbing cloth comes in contact with the substrate 1.

However, the number of liquid crystal display elements which can be produced from one substrate is reduced, and alternatively the size of the elements become small. This is because the liquid crystal elements are rectangular and an effective area from which the liquid crystal elements are produced is reduced through the chamfering process.

As described above, in the rubbing method shown in FIG. 4 there is a problem that a rubbing cloth comes in contact with a corner of the substrate, at which point hairs of the rubbing cloth may fall off, be cut off, or lie down, thereby making the hairs in contact with the corner 6 irregular. Orientating irregularity may thereby arise in an area rubbed by the irregular hairs 7, and the display of the liquid crystal display may become irregular.

In the rubbing method shown in FIG. 5, there is a problem that a sufficient space is necessary between the corner of the substrate and an end of the orientating film, and this reduces a display area of the liquid crystal display device, thus lowering productivity.

The technique shown in FIG. 6 prevents deficiency such as the orientating irregular due to irregularity in the rubbing pressure, because the rubbing is performed with the appropriate rubbing pressure by means of the measuring means 11. However, even when the technique is applied to the apparatus shown in FIG. 4, a rubbing cloth comes in contact with a corner 6 of the substrate, at which point hairs of the rubbing cloth may fall off, be cut off, or lie down, and the irregularity of the hairs in contact with the corner cannot be prevented, and thus display of the liquid crystal display may become irregular.

SUMMARY OF THE INVENTION

It is therefore an object of the present invention to provide a rubbing apparatus and a rubbing method which can prevent irregularity of the orientation and of the display in a liquid crystal display device without reduction of an effective area from which liquid crystal display elements are produced.

In order to accomplish the above object, a rubbing apparatus for rubbing a substrate of a liquid crystal display element cell comprises: a jig for enclosing a corner of the substrate; a measuring means for measuring the vertical position of the surface of the substrate and outputting a measured value; a comparison means for comparing the measured value with the vertical position of the surface of the jig; and a jig drive means for moving the jig in a vertical direction based on a signal from the comparison means so as to set a difference between the vertical position of the surface of the jig and the vertical position of the surface of the substrate within a predetermined value. The jig may be made of an electric conductor, or the surface of the jig may be made of an electric conductor. A pair of jigs may enclose the corner of the substrate, or a single jig may enclose the corner of the substrate.

The comparison means includes a central processing unit, a first storage means, and a second storage means. The central processing unit includes a microprocessor, the first storage means includes a random-access memory, and the second storage means includes a read-only memory. Information relating to the measured value of the surface of the substrate is input to the first storage means, and information relating to the surface of the jig is stored in the second storage means beforehand. The jig drive means includes a servo-motor for performing driving based on a signal from the comparison means.

The jig comprises: a contact edge corresponding to the shape of the corner of the substrate to allow the contact edge to be in contact with the corner when rubbing the substrate; and an upper surface parallel to the surface of the substrate. The rubbing apparatus further comprises: a rubbing roller of which circumference is covered with a rubbing material and of which axis is parallel to the substrate; and a roller drive means for rotating the rubbing roller around the axis and for moving the rubbing roller on the substrate.

In another aspect of the present invention, a rubbing method for rubbing a substrate of a liquid crystal display element cell using the rubbing apparatus of the present invention, comprises the steps of: setting a difference between the vertical position of the surface of the jig and the vertical position of the surface of the substrate within a predetermined value; rotating and lowering a rubbing roller to the surface of the jig, the circumference of the rubbing roller being covered with a rubbing cloth; and moving the rubbing roller in a horizontal direction from the corner onto the substrate to rub the orientating film on the surface of the substrate.

According to the present invention, the vertical position of the surface of the substrate is measured before the rubbing for the orientating film on the liquid crystal display element cell, and the distance between the substrate and the rubbing roller is maintained so as to be regular. The jig enclosing the substrate is maintained at the same vertical position as the substrate. When the rubbing roller is moved down and starts rotation, the rubbing cloth avoids contact with the edges of the substrate, preventing irregularity of the hairs of the rubbing cloth, and thereby irregularity of orientation does not arise.

An primary advantageous effect is that the irregularity of the orientation due to irregular hairs is prevented and irregularity in the display through the liquid crystal display device can be avoided.

In the conventional method, the rubbing cloth comes in contact with the corner of the substrate at the start of rubbing, the hairs of the rubbing cloth may fall off, be cut off, or lie down, thereby making the hairs in contact with the corner irregular. In the other hand, in the present invention, the substrate is enclosed with the jig, and the corner of the substrate does not dig into the rubbing cloth, thereby preventing irregularity of the hairs of the rubbing cloth.

A secondary advantageous effect is that the life of the rubbing roller is lengthened. In the conventional method, the hairs of the rubbing cloth caused become more irregular in every rubbing process due to contacting the corner of the substrate. Even when the rubbing roller is new and irregularity in the display is inconspicuous, the irregularity becomes conspicuous as the rubbing roller is repeatedly used, and therefore it is necessary to replace the rubbing roller and the rubbing cloth. According to the present invention, the hairs of the rubbing cloth do not become irregular even when contacting with the corner of the substrate, and this reduces the replacement frequency of the rubbing roller.

For example, in the conventional method, it is necessary to replace the rubbing roller every 1000 rubbing processes, while according to the present invention the apparatus is improved such that replacement is necessary every 2000 rubbing processes.

BRIEF DESCRIPTION OF THE DRAWINGS

FIG. 3A shows the background art, and FIG. 3B shows the present invention.

DETAILED DESCRIPTION OF THE PREFERRED EMBODIMENTS

Referring to figures, an embodiment of the present invention will be explained.

Figure 1:
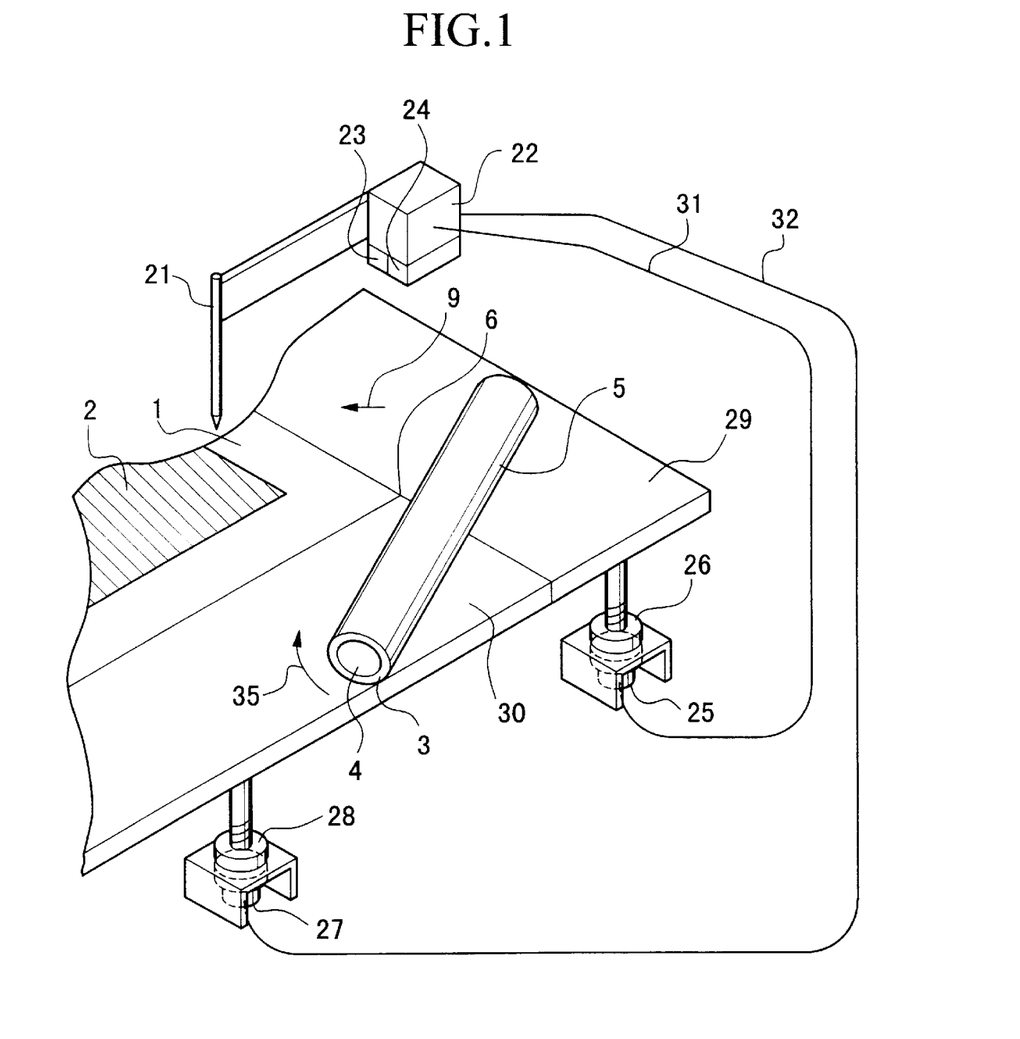
FIG. 1 is a perspective view showing the rubbing apparatus of a first embodiment of the present invention.
Figure 2A:
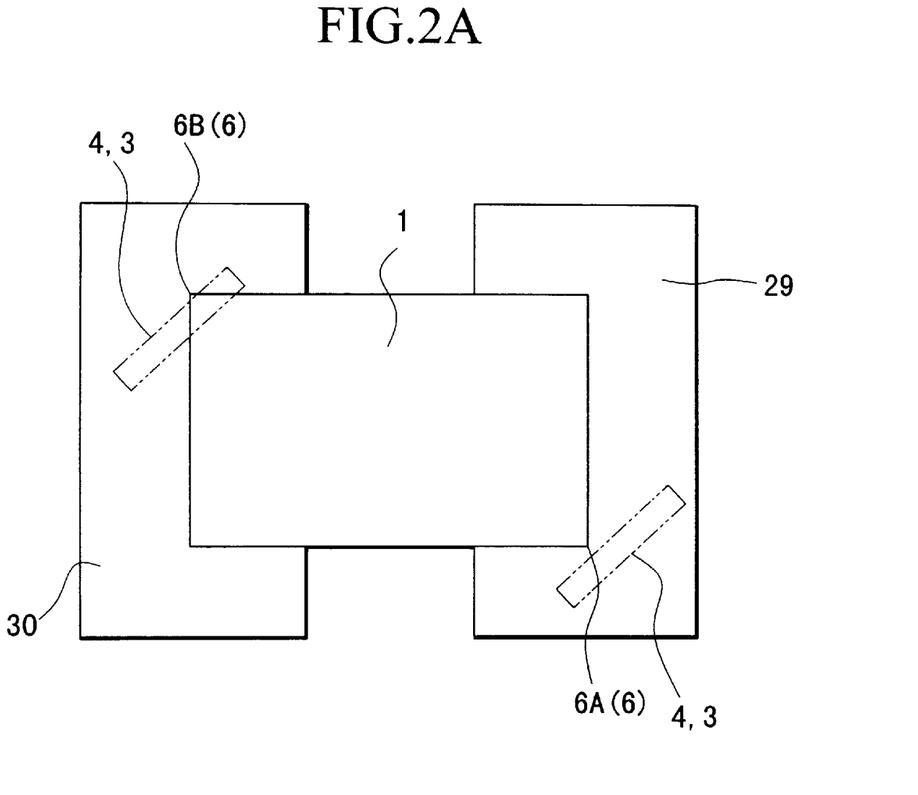
FIG. 2A is a top view showing the rubbing apparatus of a second embodiment of the present invention.
Figure 2B:
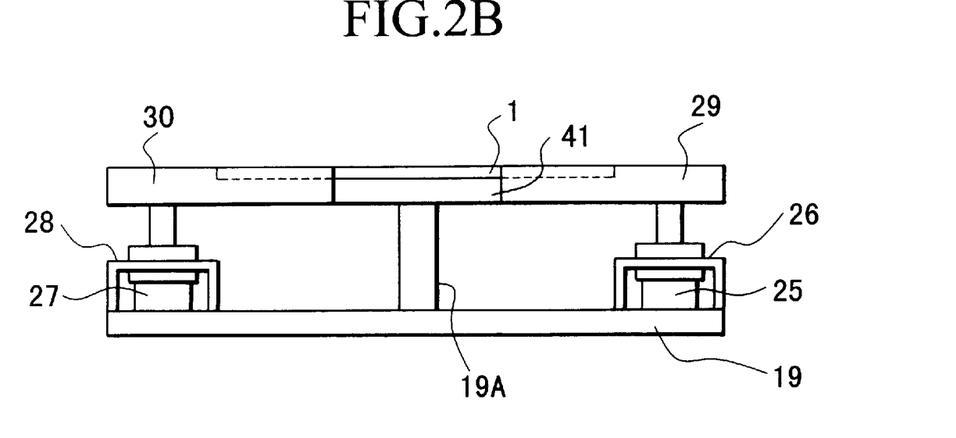
FIG. 2B is a side view showing the rubbing apparatus of a second embodiment of the present invention.

FIG. 1 is a perspective view showing a rubbing apparatus of a first embodiment according to the present invention, FIG. 2A is a top view of a rubbing apparatus of a second embodiment according to the present invention, and FIG. 2B is a side view thereof.

Referring to FIG. 1, a corner 6 of a substrate 1 with an orientating film 2 formed thereon is enclosed by a first jig 29 and a second jig 30. The substrate 1 is made of non-alkali glass and is 0.7 mm in thickness. The orientating film 2 is an organic insulating film of 500 angstroms in thickness, and preferably polyimide film, and alternatively is a film which is formed by applying a polyamic acid on the substrate.

The widths of the first jig 29 and the second jig 30 are set such that a rubbing cloth 3 does not extend beyond the first jig 29 and the second jig 30 when a rubbing roller 4 lowers to a lower rubbing roller position 5. Upper plates of the first jig 29 and the second jig 30 are alumina-ceramic plates, which have plane rectangular shapes, plane L-shapes, or plane U-shapes. Since in the embodiment of FIG. 1 they have a plane rectangular shape, the two jigs, which are the first jig 29 and the second jig 30, enclose the corner 6 of the substrate 1.

Each of the jigs 29 and 30 has a straight contact edge corresponding to a straight side of the substrate. The first jig 29 and the second jig 30 form a shape corresponding to the corner of the substrate 1, so that the first jig 29 and the second jig 30 preferably fit to the corner of the substrate 1 during rubbing process. That is, the first jig 29 and the second jig 30 form the same angle as the corner, which is 90 degrees in the embodiment. Further, the upper surfaces of the first jig 29 and the second jig 30 are formed to be, for example, completely flat and parallel to the upper surface of the substrate 1 in order to allow a rotating rubbing roller 4 to slide smoothly from the jigs 29 and 30 onto the upper surface of the substrate 1.

The height of the surface of the substrate 1 is measured by means of a dial gage, and a measured value is converted into an electric signal, which is output to a central processing unit 22.

The apparatus has a control means comprising the central processing unit 22 which includes a microprocessor. A storage means storing programs for controlling various operations of the rubbing apparatus is connected to the central processing unit 22. The storage means comprises a first storage means 23 which includes a random-access memory, and a second storage means 24 which includes a read-only memory.

The first jig 29 and the second jig 30 are vertically movable by means of first jig elevator 26 and second jig elevator and 28, respectively. The first jig elevator 26 and second jig elevator 28 are electrically connected to the central processing unit 22 through cables 31 and 32.

A vertical position of the substrate 1 is measured by a measuring means 21. The measured value is transmitted to the central processing unit 22, is stored in the random-access memory 23 which is the first storage means, and is compared with data relating to vertical positions of the first jig 29 and second jig 30, data which has been stored beforehand in the read-only-memory 24, which is the second storage means, and thus a differential signal is output. The differential signal is transmitted to servo-motors 25 and 27 in the first jig elevator 26 and the second jig elevator 28, which move the first jig 29 and the second jig 30 up or down so that their surfaces aligns to the upper surface of the substrate.

That is, the measured value is transmitted to the central processing unit 22 and is stored in the first storage means 23. The second storage means 24 in the central processing unit 22 stores original positions of the first jig 29 and the second jig 30. The original positions of the jigs and the position of the substrate are compared, and when the difference is greater than a predetermined value, drive voltages corresponding the difference between the original positions and the position of the substrate are applied to the servo-motors 25 and 27, which moves the first jig 29 and the second jig 30 up or down so that the upper surface of the substrate 1 aligns to the upper surfaces of the first jig 29 and the second jig 30.

The apparatus has a cylindrical rubbing roller 4 the circumference of which is covered with a rubbing cloth 3 and the axis of which is parallel to said substrate, and a roller drive means (not shown) for rotating and moving the rubbing roller 4 in a horizontal direction parallel to the upper surface of the substrate 1, while rubbing the orientating film 2.

By adjusting the vertical positions of the first jig 29 and the second jig 30, since the first jig 29 and the second jig 30 perfectly fit to the corner of the substrate 1 in a rubbing process, the upper surfaces of the first jig 29, the second jig 30, and the substrate 1 form one plane, so that in the rubbing process the rotating rubbing roller 4 can slide smoothly from the jigs 29 and 30 onto the upper surface of the substrate 1.

In this embodiment, in a manner similar to an embodiment shown in FIG. 2B, there is provided a stage made of metal or ceramic, which is supported by a stage support above a metal stage base, and the substrate 1 having the orientating film is placed on the stage by vacuum suction.

Referring to FIG. 1, after the vertical position of the surface of the corner 6 of the substrate 1 corresponds to that of the surfaces of the first jig 29 and the second jig 30, a rubbing roller 4 is lowered to the lower rubbing roller position 5 obliquely from above and is moved in a roller movable direction 9.

The rubbing roller 4 made of, for example, aluminum, and has a rubbing cloth 3 made of rayon around the circumference, and alternatively the rubbing roller 4 may comprise an iron cylinder around which the rubbing cloth 3 is attached. The rubbing roller 4 is lowered to the lower rubbing roller position 5, is rotated at 300 rpm in a rotational direction 35, and is moved in a roller movable direction 9 to perform rubbing. The rubbing cloth 3 is pressed into the first jig 29 and the second jig 30 by 0.3 mm.

According to the present invention, because the vertical position of the surface of the corner 6 of the substrate 1 corresponds to those of the jigs 29 and 30, the rubbing cloth 3 can be prevented from being damaged by the corner 6 and the hairs of the rubbing cloth 3 are prevented from becoming irregular. After the rubbing, the first jig 29 and the second jig 30 are returned to the original positions according to their program.

FIG. 2A is a top view of a second embodiment and FIG. 2B is a side view of the second embodiment. In FIG. 2, reference numerals which are identical to those of FIG. 1, respectively, indicate elements which are identical to those of the first embodiment; therefore, explanation thereof will be omitted. The second embodiment includes a measuring means and a central processing unit similar to those in the first embodiment; therefore, illustration thereof will be omitted.

As shown in FIG. 2A, the second embodiment employs a U-shaped jig which encloses corners of a substrate 1.

Each of the jigs 29 and 30 has an indented portion corresponding to a side of the substrate. The first jig 29 and the second jig 30 are positioned on both sides of the substrate 1, enclosing four corners having angles of 90 degrees and the two parallel sides, so that the first jig 29 and the second jig 30 may preferably fit to the both sides of the substrate 1 in a rubbing process. Further, the upper surfaces of the first jig 29 and the second jig 30 are formed to be, for example, completely flat and parallel to the upper surface of the substrate 1 in order to allow a rotating rubbing roller 4 to slide smoothly from the jigs 29 and 30 onto the upper surface of the substrate 1.

A first jig 29 encloses a first corner 6A of the substrate 1, and a second jig 30 encloses a second corner 6B of the substrate 30. In a manner similar to the first embodiment, after the surface of the substrate aligns to the surfaces of the first jig and the second jig, a rubbing roller 4 is lowered to a lower rubbing roller position in the first jig 29, and is moved over the substrate 1 from the first corner 6A, rubbing the orientating film using the rubbing cloth 3. After the rubbing, the rubbing roller 4 comes out from the second corner 6B to the second jig 30, and is raised from the second jig 30.

By adjusting the vertical positions of the first jig 29 and the second jig 30, since the first jig 29 and the second jig 30 perfectly fit to the corners of the substrate 1 in a rubbing process, the upper surfaces of the first jig 29, the second jig 30, and the substrate 1 form one plane, so that in the rubbing process the rotating rubbing roller 4 can slide smoothly from the jig 29 over the upper surface of the substrate 1 to the jig 30.

As shown in FIG. 2B, there is provided a stage 41 made of metal or ceramic, which is supported by a stage support 19A above a metal stage base 19, and the substrate 1 having the orientating film (not shown in FIG. 2) is placed on the stage 41 by vacuum suction.

Figure 3A:
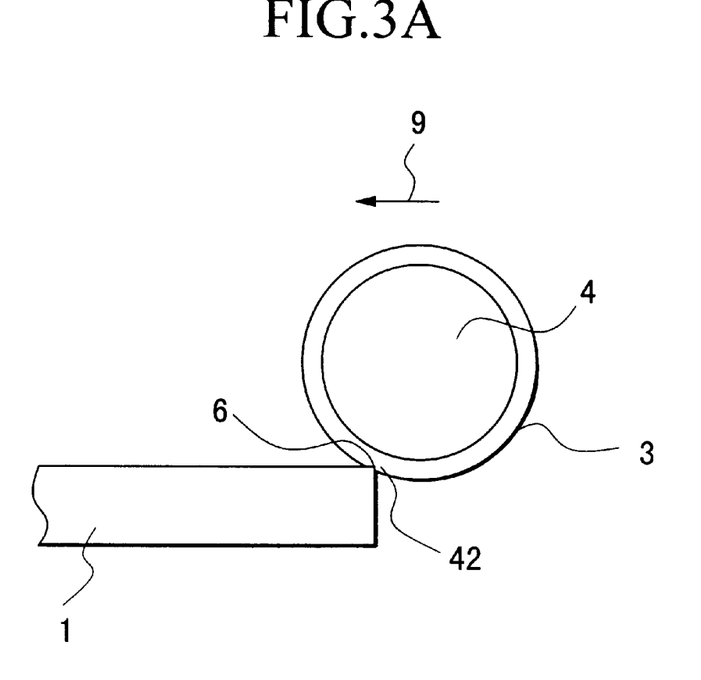
FIGS. 3A and 3B are views comparing the effect of the present invention with that of the background art.
Figure 3B:
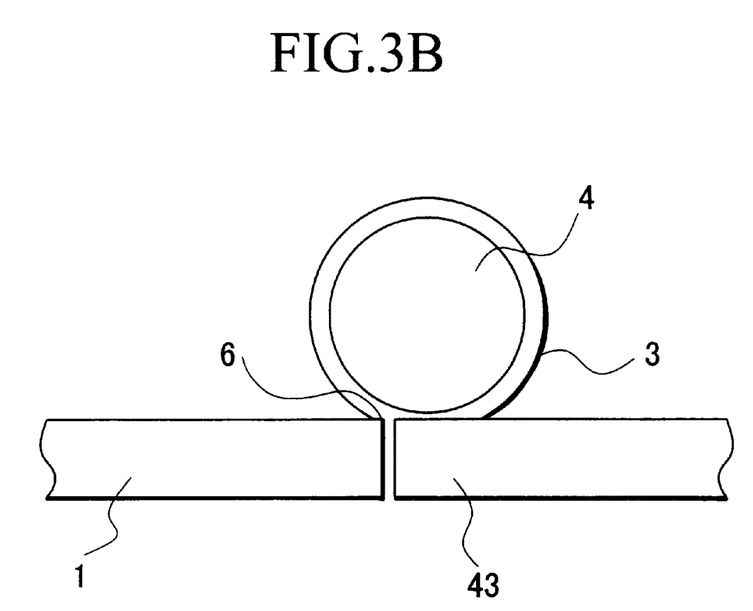

FIGS. 3A and 3B show a comparison of background art (FIG. 3A) with the present invention (FIG. 3B). As shown in the background art of FIG. 3A, a portion 42 of hairs of the rubbing cloth 3 become irregular at the corner 6 of the substrate 1. As shown in the present invention of FIG. 3B, irregularity in the hairs of the rubbing cloth 3 does not occur at the corner 6 of the substrate 1.

While in the above embodiments the first jig and the second jig are alumina-ceramic plates, stainless or other electric conductors may be used for the first jig and the second jig. The first jig and the second jig may have alumina-ceramic surfaces which are metalized with nickel or molybdenum to provide conductivity.

Even when there is possibility that active devices (such as transistors) on the substrate are destroyed during rubbing because of static electricity caused by friction between the rotating rubbing roller 4 and the surface of the jig, by making the surface of the jig conductive, occurrence of the static electricity can be prevented, and an accident due to the static electricity can be avoided.

In the first embodiment of FIG. 1, the two rectangle plane jigs 29 and 30 enclose the corner 6 of the substrate 1, and in the second embodiment of FIG. 2, the U-shaped plane jig encloses the corners. A L-shaped plane jig may enclose the corner 6 which is the starting point of rubbing for the substrate 1. As long as the shape of the jig corresponds to that of the corner of the substrate, a shape of a jig for enclosing the corner of the substrate may be modified and a jig having other various shape can be employed. Depending on the shape of the outline and size of the substrate, three and more jigs may be applied so that the edges of the substrate do not come in contact with the rubbing roller. Although the control means in the embodiment uses random-access memory as the first storage means and read-only memory as the second storage means, other types of storage means can be employed.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A rubbing apparatus for rubbing a substrate of a liquid crystal display element cell, comprising:

a jig for enclosing a corner of said substrate;

a measuring means for measuring the vertical position of a surface of said substrate and outputting a measured value;

a comparison means for comparing said measured value with a vertical position of a surface of the jig and outputting a signal based on said comparison; and a jig drive means for moving said jig in the vertical direction based on said signal from said comparison means so as to set a difference between the vertical position of the surface of said jig and the vertical position of the surface of said substrate within a predetermined value.

2. A rubbing apparatus according to claim 1, wherein said jig is made of an electric conductor.

3. A rubbing apparatus according to claim 1, wherein the surface of said jig is made of an electric conductor.

4. A rubbing apparatus according to claim 1, wherein a pair of jigs encloses said corner of said substrate.

5. A rubbing apparatus according to claim 1, wherein a single jig encloses said corner of said substrate.

6. A rubbing apparatus according to claim 1, wherein said comparison means includes a central processing unit for comparing the values, a first storage means for storing information relating to said substrate, and a second storage means for storing information relating to said jig.

7. A rubbing apparatus according to claim 6, wherein said central processing unit includes a microprocessor, said first storage means includes a random-access memory, said second storage means includes a read-only memory.

8. A rubbing apparatus according to claim 6, wherein information relating to the measured value of the surface of said substrate is input to said first storage means, and information relating to the surface of said jig is pre-stored in said second storage means.

9. A rubbing apparatus according to claim 1, wherein said jig drive means includes a servo-motor for performing driving based on a signal from said comparison means.

10. A rubbing apparatus according to claim 1, wherein said jig comprises: a contact edge corresponding to a shape of said corner of said substrate to allow said contact edge to be in contact with said corner when rubbing said substrate; and an upper surface parallel to the surface of said substrate.

11. A rubbing apparatus according to claim 1, further comprising: a rubbing roller the circumference of which is covered with a rubbing material and the axis of which is parallel to said substrate; and a roller drive means for rotating said rubbing roller around said axis and for moving said rubbing roller on the substrate.

12. A rubbing method for rubbing a substrate of a liquid crystal display element cell, comprising the steps of:

setting a difference between the vertical position of the surface of said jig and the vertical position of the surface of said substrate within a predetermined value;

rotating and lowering a rubbing roller to the surface of said jig, the circumference of said rubbing roller being covered with a rubbing cloth; and moving said rubbing roller in a horizontal direction from said corner onto said substrate to rub said orientating film on the surface of said substrate.

13. A rubbing apparatus for rubbing a substrate of a liquid crystal display element cell, comprising:

a jig for enclosing a corner of said substrate;

a vertical measurement device operative to measure the vertical position of a surface of said substrate and output a measured value;

a comparator operative to compare said measured value with a vertical position of a surface of the jig and output a signal based on said comparison; and a jig driver operative to move said jig in the vertical direction based on said signal from said comparator so as to set a difference between the vertical position of the surface of said jig and the vertical position of the surface of said substrate within a predetermined value, thereby aligning said substrate surface with said jig surface.

14. A rubbing apparatus according to claim 13, wherein said jig is made of an electric conductor.

15. A rubbing apparatus according to claim 13, wherein the surface of said jig is made of an electric conductor.

16. A rubbing apparatus according to claim 13, wherein a pair of jigs encloses said corner of said substrate.

17. A rubbing apparatus according to claim 13, wherein a single jig encloses said corner of said substrate.

18. A rubbing apparatus according to claim 13, wherein said comparator includes a central processing unit for comparing the values, a first storage device operative to store information relating to said substrate, and a second storage device for storing information relating to said jig.

19. A rubbing apparatus according to claim 18, wherein said central processing unit includes a microprocessor, said first storage device includes a random-access memory, said second storage device includes a read-only memory.

20. A rubbing apparatus according to claim 18, wherein information relating to the measured value of the surface of said substrate is input to said first storage device, and information relating to the surface of said jig is pre-stored in said second storage device.

21. A rubbing apparatus according to claim 13, wherein said jig driver includes a servo-motor operative to drive said jig based on a signal from said comparator.

22. A rubbing apparatus according to claim 13, wherein said jig comprises: a contact edge corresponding to a shape of said corner of said substrate to allow said contact edge to be in contact with said corner when rubbing said substrate; and an upper surface parallel to the surface of said substrate.

23. A rubbing apparatus according to claim 13, further comprising: a rubbing roller the circumference of which is covered with a rubbing material and the axis of which is parallel to said substrate; and a roller driver operative to rotate said rubbing roller around said axis and move said rubbing roller on the substrate.

24. A rubbing apparatus for rubbing a substrate of a liquid crystal display element cell, comprising:

a jig for enclosing a corner of said substrate;

a measuring means for measuring the vertical position of a surface of said substrate and outputting a measured value;

a comparison means for comparing said measured value with a vertical position of a surface of the jig and outputting a signal based on said comparison; and a jig drive means for moving said jig in the vertical direction based on said signal from said comparison means so as to set a difference between the vertical position of the surface of said jig and the vertical position of the surface of said substrate within a predetermined value, thereby aligning said substrate surface with said jig surface.

25. A rubbing apparatus according to claim 24, wherein said jig is made of an electric conductor.

26. A rubbing apparatus according to claim 24, wherein the surface of said jig is made of an electric conductor.

27. A rubbing apparatus according to claim 24, wherein a pair of jigs encloses said corner of said substrate.

28. A rubbing apparatus according to claim 24, wherein a single jig encloses said corner of said substrate.

29. A rubbing apparatus according to claim 24, wherein said comparison means includes a central processing unit for comparing the values, a first storage means for storing information relating to said substrate, and a second storage means for storing information relating to said jig.

30. A rubbing apparatus according to claim 29, wherein said central processing unit includes a microprocessor, said first storage means includes a random-access memory, said second storage means includes a read-only memory.

31. A rubbing apparatus according to claim 29, wherein information relating to the measured value of the surface of said substrate is input to said first storage means, and information relating to the surface of said jig being stored in said second storage means beforehand.

32. A rubbing apparatus according to claim 24, wherein said jig drive means includes a servo-motor for performing driving based on a signal from said comparison means.

33. A rubbing apparatus according to claim 24, wherein said jig comprises: a contact edge corresponding to a shape of said corner of said substrate to allow said contact edge to be in contact with said corner when rubbing said substrate; and an upper surface parallel to the surface of said substrate.

34. A rubbing apparatus according to claim 24, further comprising: a rubbing roller the circumference of which is covered with a rubbing material and the axis of which is parallel to said substrate; and a roller drive means for rotating said rubbing roller around said axis and for moving said rubbing roller on the substrate.

* * * * *